United States Patent Office 2,965,493
Patented Dec. 20, 1960

2,965,493
CHIFFON

John J. Mancuso, Astoria, and James L. Common, Briarcliff Manor, N.Y., assignors to General Foods Corporation, White Plains, N.Y., a corporation of Delaware No Drawing. Filed Nov. 10, 1958, Ser. No. 772,727

7 Claims. (Cl. 99—139)

This invention relates to a new whipping composition for use as a fruit flavored chiffon food product or pie filling.

Chiffon, when employed as a flavored dessert product such as pie filling, should evidence a high degree of overrun, good peaking, and fineness and uniformity of aerated cellular structure. Chiffon, as distinguished from other high solids whips such as marshmallow, is characteristically composed of solids in the order of 30–40% and is considered a low solids content whip when compared with creme whips, for example, which exhibit a much heavier viscous texture. As an example of the distinction between the two types of whips, the use of various water-soluble gums, such as Irish Moss, gum arabic, or carboxymethyl cellulose, which offer stability to a high solids sugar whip, is not considered desirable in chiffon type whips because of the need for a delicate, reticular, aerated structure, which chiffon whips in fact are more of the nature of a foam system. Chiffon, in addition, is characterized as having a uniform non-tacky separation or cleavage when sectioned into wedges or slices. When viewed in cross section, a cut of chiffon should exhibit a fine capillary network of uniformly arranged cells of delicate texture. Therefore, it is seen that the light foamy texture of chiffon is not essential to high density cohesive whips, such as cremes or frappe products, and the problem of foam stability found in chiffons is not as critical in whips having a more dense and viscous composition.

The conventional manner of preparation of chiffon calls for a careful and to some extent skillfully prepared recipe wherein a pudding or gelatin dessert is added into a stiff meringue which has been separately prepared by admixing and whipping egg white and sugar syrup. However, such a procedure is time consuming and does not assure consistent results. The meringue frequently decreases in volume when the other ingredients are folded into it. Moreover, the chiffon product develops a tough, unpalatable, rubbery skin if left uncovered for any length of time. As a result, such preparations are inconvenient to prepare, may not be relied upon to provide the desirable chiffon texture under all circumstances, and suffer from a lack of stability of the foam produced in many instances.

It would clearly be advantageous to employ a composition which could be readily reconstituted in water or other aqueous liquid, which would not require a number of separate careful steps in preparation, and would evidence a satisfactory chiffon gel stability. Unfortunately, the usual whipping agent employed in preparing chiffon, viz., egg white, cannot be readily whipped in the presence of other desirable ingredients of the chiffon. These latter ingredients either increase the whipping time necessary or else inhibit the desired overrun, stability, and texture of the chiffon foam. It would be desirable to provide a composition capable of producing a fruit chiffon having all of the foregoing desired texture characteristics which can be quickly whipped with a minimum of effort to a stabilized foam substantially free of separation.

According to the present invention it has now been found that an instant fruit chiffon possessing a stable, delicate, foamy structure, capable of being whipped in a short time with a minimum amount of effort to a high degree of overrun, can be obtained by the addition of a member of a particular class of mannolactan gums, the best known being Guar gum or locust beam gum, which are polysaccharide hydrolyzates containing the hexoses, mannose and galactose. It has now been discovered that by the addition of such mannolactan gum to an instant type formulation comprising in combination partially degraded soy protein and gelatin, a whipped foam is produced which exhibits a high degree of overrun and a delicate, aerated gel structure of a satisfactory chiffon. The gelled foam produced has enduring stability when compounded in a gelatin-containing instant chiffon composition and will resist variations in room temperature.

The invention preferably comprises compounding partially degraded soy protein, Guar gum, gelatin, and a molecularly dehydrated phosphate selected from the group of metaphosphoric acid and hypophosphoric acid and their acid salts, e.g., sodium polymetaphosphate and sodium hexametaphosphate, in combination to be whipped with a sugar solution. Most preferably, dried pregelatinized starch is also added to the composition to aid stabilization.

The partially degraded soy protein may be obtained by the acid, alkali, or enzyme digestion of proteinaceous extracts of soybean. For the purposes of the present invention it is preferred that the hydrolyzate of soy protein be enzymatically partially degraded so as to contain polypeptides, oligopeptides, and amino acids. For the purposes of the present invention soy protein which has been enzymatically hydrolyzed with pepsin to from 10–18% is preferred, although trypsin and pancreatin have been successfully employed. A typical soy proteinaceous whipping agent and the analysis thereof is as follows:

| | | |
|---|---|---|
| Total nitrogen | percent | 9.9 |
| Amino nitrogen | do | 1.1 |
| Ash | do | 13.4 |
| Moisture | do | 4.6 |
| pH (1% solution) | | 5.5 |

Total nitrogen is determined by the Kjeldhal method and amino nitrogen is determined by the method described by David M. Breenberg in "Amino Acids and Proteins," published by Charles C. Thomas, Springfield, Illinois, 1951, on pages 80, 81, and 246.

Guar gum added in quantities less than one part by weight will act as a stabilizing agent for the gel system. It appears to preserve the delicate reticular network of cells formed in the chiffon whip and prevents collapse of the fine cellular network underlying the proteinaceous foam. It has been found that the Guard gum level which is critical should not be less than .16 gm. nor more than .60 gm. per package to obtain the most desirable product.

Both high and low bloom gelatin may be employed as well as substituted gelatins. The level of gelatin which would normally be employed in compounding the present composition will vary depending upon the bloom of the gelatin, the higher bloom gelatins being required at a generally lower level. For the purposes of the present invention gelatin having a Bloom Strength of 150–250 and preferably 180–220 units is desired.

*Example I*

The preferred range of proportions of ingredients in the present composition is as follows:

| Ingredients: | Parts/weight (gms.) |
|---|---|
| Sugar | 50.00–70.00 |
| Dried pregelatinized starch | 3.00–11.00 |
| Gelatin | 3.00–6.00 |
| Partially degraded soy protein | 0.50–1.50 |
| Edible organic food acid | 1.00–1.50 |
| Molecularly dehydrated phosphate | 0.10–0.50 |
| Guar gum | 0.18–0.60 |

The dried pregelatinized starch employed acts as a binder for the foam system and prevents separation of the ingredients prior to refrigeration. Unlike cooked starch, the dried pregelatinized starch is not fully rehydrated upon addition of the composition to a sugar solution and has hydrophilic properties. This affinity of pregelatinized starch for water appears to reduce the level of free available water during whipping and thereby controls the overrun, preventing excessively high volume whip, as well as tending to stabilize the foam system after whipping but before the gelatin is set, thus aiding in the elimination of layering of the chiffon prior to gelation. Moreover, the presence of dried pregelatinized starch supplies the product with the necessary body yielding a sensation of fullness as the chiffon is consumed.

The partially hydrolyzed soy protein ingredient supplies the foam volume and aeration needed for chiffon texture. It is employed primarily as a whipping agent. A decrease in the level of hydrolyzed soy protein tends to lengthen the whipping time necessary to achieve a satisfactory whip. The water-soluble mannolactan gum, such as Guar gum, locust bean gum, etc., acts so as to stabilize the foam system and will inherently increase the viscosity of the mixture when placed in aqueous solution.

The molecularly dehydrated phosphate, acid or salt thereof employed, such as the sodium or potassium salts of meta-, hypo-, or pyrophosphoric acid, or the acids themselves act to preset the proteinaceous foam formed by the partially hydrolyzed soy protein when acting in the presence of the edible food acid which cooperates by lowering the pH of the system. The pH of the system will vary with the particular acid employed and will normally range between 2.8 and 3.8. The particular food acid employed is not critical to the invention and any organic or inorganic acid which depresses the pH to below 5, such as citric acid, tartaric acid, adipic acid, fumaric acid, maleic acid, phosphoric acid, and the corresponding acid salts of the alkali metals and alkaline earths with such organic and inorganic acids, e.g., citrates, tartrates, phosphates, and maleates of sodium, potassium, calcium, or ammonium, either employed singularly or in combination, may be employed.

Sugar, such as dextrose, sucrose, maltose, levulose, and fructose, provides the sweetness desired to round off the fruit flavor. Saccharide mixtures, such as dried corn syrup solids may also be employed. The preferred sweetening agent is sucrose, although dextrose has also proven to be satisfactory.

The invention is further illustrated by the following example:

*Example II*

A lemon chiffon was prepared from the following ingredients which are dry blended together.

| Ingredients: | Parts/weight (gms.) |
|---|---|
| Sucrose | 65.27 |
| Dried pregelatinized starch | 10.50 |
| Gelatin | 4.30 |
| Partially degraded soy protein | 1.03 |
| Flavor | 0.60 |
| Citric acid | 1.20 |
| Salt | 0.23 |
| Sodium hexametaphosphate | 0.22 |
| Color | 1.50 |
| Guar gum | 0.20 |

The above dry blended ingredients are placed in a large, deep mixing bowl and one-half cup boiling water is then added and the ingredients hydrated by thorough mixing. One-half cup cold water is then added and beating conducted at high speed in an electric mixer is carried out for about one minute or until the product is very foamy. Addition of one-third cup sugar then follows and the product is beaten for one to three minutes until the filling stands in peaks. The mixture is then poured into a cooled, baked eight-inch shell and chilled in the refrigerator for two hours until the gel is set. A chiffon so prepared has a delicate, stable chiffon texture, is not rubbery when cooled, and exhibits the characteristics of an entirely satisfactory chiffon.

While the above example discloses preparation with lemon flavor, it must be understood that the concept of the invention extends to all fruit flavored gelatin-containing chiffon formulations. Moreover, it must be understood that the solids content or density of the product produced may never exceed 40% solids and the water content must be such as not to exceed this density level.

It will be understood that while the invention has been described in part by means of specific examples, reference should be had to the appended claims for a definition of the scope of the invention.

What is claimed is:

1. A composition for preparing fruit flavored chiffon which comprises in combination gelatin, a water-soluble mannolactan gum from the group consisting of Guar gum and locust bean gum, partially degraded soy protein, sugar, and an edible organic acidic substance providing a pH not in excess of 5 when the composition is placed in solution.

2. A composition for preparing fruit flavored chiffon which comprises in combination gelatin, a water-soluble mannolactan gum from the group consisting of Guar gum and locust bean gum, partially degraded soy protein, sugar, dried pregelatinized starch, and an edible organic acidic substance providing a pH not in excess of 5 when the composition is placed in solution.

3. A composition for preparing fruit flavored chiffon which comprises in combination gelatin, a water-soluble mannolactan gum from the group consisting of Guar gum and locust bean gum, partially degraded soy protein, sugar, a molecularly dehydrated phosphate, and an edible organic acidic substance providing a pH not in excess of 5 when the composition is placed in solution.

4. A composition for preparing fruit flavored chiffon according to claim 3 wherein the molecularly dehydrated phosphate is selected from the group consisting of metaphosphate and hypophosphate.

5. A composition for preparing fruit flavored chiffon having a pH not in excess of 5 comprising in admixture with an edible organic acidic substance the following ingredients in parts by weight:

| | |
|---|---|
| Sugar | 50.00–70.00 |
| Gelatin | 3.00–6.00 |
| Partially degraded soy protein | 0.50–1.50 |
| A molecularly dehydrated phosphate | 0.10–0.50 |
| Guar gum | 0.18–0.60 |

6. A composition comprising the following ingredients in parts by weight:

| | |
|---|---|
| Sugar | 50.00–70.00 |
| Gelatin | 3.00–6.00 |
| Partially degraded soy protein | 0.50–1.50 |
| Edible organic food acid | 0.10–0.50 |
| A molecularly dehydrated phosphate | 0.10–0.50 |
| Guar gum | 0.18–0.60 | wherein the pH of the composition when placed in solution does not exceed 5.

7. A composition comprising the following ingredients in parts by weight:

| | |
|---|---|
| Sugar | 50.00–70.00 |
| Dried pregelatinized starch | 3.00–11.00 |
| Gelatin | 3.00–6.00 |
| Partially degraded soy protein | 0.50–1.50 |
| Edible organic food acid | 0.10–0.50 |
| A molecularly dehydrated phosphate | 0.10–0.50 |
| Guar gum | 0.18–0.60 | wherein the pH of the composition when placed in solution does not exceed 5.

References Cited in the file of this patent

UNITED STATES PATENTS

| | | |
|---|---|---|
| 2,444,241 | Beckel et al. | June 29, 1948 |
| 2,502,397 | Werbin | Mar. 28, 1950 |
| 2,588,308 | Tressler | Mar. 4, 1952 |
| 2,844,468 | Gunther | July 22, 1958 |

OTHER REFERENCES

"Everybody's Cookbook," by Lord, revised edition, Harcourt, Brace and Company, New York, pages 800 and 801.